United States Patent [19]
Shinobu

[11] Patent Number: 5,626,165
[45] Date of Patent: May 6, 1997

[54] VALVE FOR RE-CIRCULATING EXHAUST GAS

[75] Inventor: Hideyuki Shinobu, Kakuda, Japan

[73] Assignee: Hadsys, Inc., Miyagi-ken, Japan

[21] Appl. No.: 543,947

[22] Filed: Oct. 17, 1995

[30] Foreign Application Priority Data

Oct. 17, 1994 [JP] Japan .................................. 6-250807

[51] Int. Cl.$^6$ .................................................. F16K 31/06
[52] U.S. Cl. ................... 137/556; 251/129.15; 137/554; 335/255
[58] Field of Search .................... 251/129.01, 129.15; 123/571; 335/255, 274, 279; 137/553, 554, 556

[56] References Cited

U.S. PATENT DOCUMENTS 4,725,040   2/1988   Fornuto et al. ................ 251/129.15
5,020,505   6/1991   Grey et al. .
5,435,519   7/1995   Everingham .................. 251/129.15
5,467,962   11/1995  Bircann et al. ................ 251/129.15
5,476,313   12/1995  Lauer .......................... 251/129.15 X

FOREIGN PATENT DOCUMENTS 3-77876   8/1991   Japan .

*Primary Examiner*—Kevin Lee
*Attorney, Agent, or Firm*—Paul A. Guss

[57] ABSTRACT

When an armature is displaced by application of a voltage to an electromagnetic coil, a second elastic member contracts in opposition to the restorative force of the second elastic member, wherein a washer, the second elastic member, and the armature are displaced integrally. The armature abuts against the washer, and thereafter a first elastic member is compressed in a direction to close the valve, the first elastic member being compressed in opposition to its restorative force, whereby a main valve body is separated from a valve seat. As a result, exhaust gas is introduced through an inlet port and communicates with an outlet port.

8 Claims, 10 Drawing Sheets

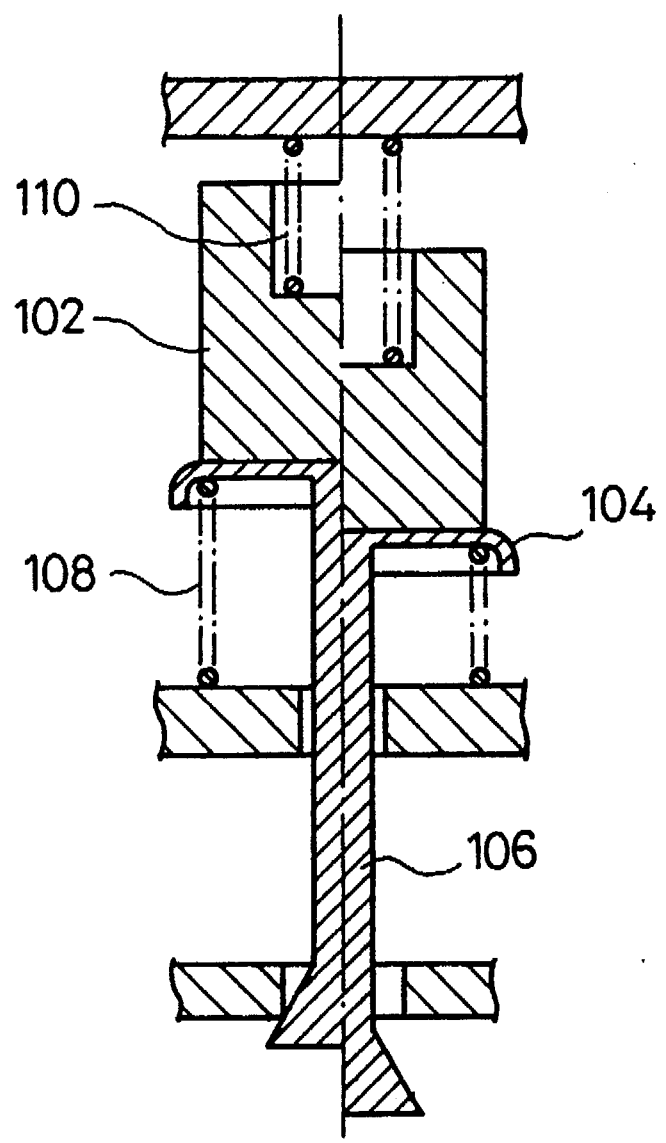

VALVE FOR RE-CIRCULATING EXHAUST GAS

BACKGROUND OF THE INVENTION

1. Field of the Invention

The present invention relates to a valve for recirculating exhaust gas which enables harmful components such as $NO_x$ contained in exhaust gas discharged from an internal combustion engine to be kept as low as possible by re-circulating the exhaust gas discharged from the internal combustion engine through an intake system.

2. Description of the Related Art

Valves for re-circulating exhaust gas have been hitherto used in order to remove harmful components discharged from internal combustion engines. For example, U.S. Pat. No. 5,020,505 discloses a system having a mechanism in which an electromagnetic coil assembly 72 is used to displace a shaft 38 of a valve member 36, wherein the valve member 36 is separated from a seat portion 24, thereby permitting an inlet 20 to communicate with an outlet 22 (see FIG. 10). More specifically, in this mechanism, an armature core 76 is displaced by applying a predetermined voltage to the electromagnetic coil assembly 72, so that the valve member 36 integrally formed with the armature core is opened.

On the other hand, Japanese Laid-open Utility Model Publication No. 3-77876 also discloses a valve for recirculating exhaust gas of this type. Japanese Laid-open Utility Model Publication No. 3-77876 discloses the following technique. A coil spring 15 and a coil spring 9 are arranged so that their restorative forces act in opposite directions to one another. A plunger 14 is lifted while opposing to the restorative force of the coil spring 15 by applying a predetermined voltage to a coil 12. Concurrently, the restorative force of the coil spring 9 is used to move a valve shaft 6a toward the coil 12, so that a valve body 6 is separated from a valve seat 4. Thus, an inlet port 2 is allowed to communicate with an outlet port 3 (see FIG. 11).

In order to prevent any mismatch that may arise between the shaft centers of the armature core 76 and the valve member 36 in one conventional technique described in U.S. Pat. No. 5,020,505, and shown in FIG. 10, the armature core 76 and the valve member 36 are constructed so that a certain amount of deviation in directions perpendicular to an axial direction of the shafts is permitted. However, in such a system, when the valve member 36 is seated on the seat portion 24 on an outlet side, the combined inertial forces of the armature core 76 and the valve member 36 act on the seat portion 24. Accordingly, as the frequency of use increases, the valve member 36 and the seat portion 24 undergo abrasion and deformation. As a result, when the valve member 36 is seated on the seat portion 24, a bouncing motion or vibration takes place. Consequently, it has been difficult to achieve a reliable action for re-circulating exhaust gas with high accuracy.

In order to suppress the bouncing motion described above, it is possible to increase the restorative force (load) of a spring member so that the armature core 76 is energized in a direction simply to close the valve. However, such a countermeasure is accompanied by the necessity for an electromagnetic coil assembly for generating a large electromagnetic force to overcome the restorative force of the spring member. As a result, an inconvenience arises in that the electromagnetic coil assembly itself becomes large, and the production cost becomes expensive.

On the other hand, in another conventional technique described in Japanese Laid-open Utility Model Publication No. 3-77876, and shown in FIG. 11, the plunger 14, which is displaced by the coil spring 15, is structurally separated from the valve body 6 which actually works for opening and closing the valve. However, in such an arrangement, in addition to the coil spring 15 for seating the valve body 6 on the valve seat 4, a second coil spring 9 is required to allow the valve shaft 6a on one side of the valve body 6 to abut against a lower end of the plunger 14. Further, each of the coil springs 15, 9 have forces which act in directions that are opposite to one another, and the restorative force of the coil spring 15 must be selected to be greater than the restorative force of the coil spring 9. Therefore, the applied load for seating the valve body 6 on the valve seat 4 is a synthesized load based upon the respective loads of the two coil springs 15, 9. Namely, a load obtained by subtracting the load of the coil spring 9 for opening the valve from the load of the coil spring 15 for closing the valve is used for performing the action. This requires the necessity of an excessively large voltage to the coil 12 for opening the valve. Further, this technique includes the further inconvenience that, if the accuracy of the coil spring 15 for closing the valve and the accuracy of the coil spring 9 for opening the valve are different from each other, this difference directly and adversely affects the operational stability of the valve as it is controlled to be opened or closed, impairing the ability to perform control with high accuracy.

SUMMARY OF THE INVENTION

A general object of the present invention is to provide a valve for re-circulating exhaust gas for controlling communication between an inlet port and an outlet port, wherein abrasion and deformation of the valve body and valve seat upon the seating of the valve body can be suppressed, along with preventing a bouncing motion upon seating of the valve body on the valve seat, and wherein miniaturization of an actuator portion is achieved by reducing the electromagnetic force required for actuating the valve, and wherein the accuracy of control for opening and closing the valve is vastly improved.

A principal object of the present invention is to provide a valve for re-circulating exhaust gas, comprising:

a body having a passage therein for re-circulating an exhaust gas, the body including an inlet port and an outlet port;

a valve seat provided in the passage for re-circulating the exhaust gas;

a valve body for controlling the amount of exhaust gas flowing through the passage for re-circulating the exhaust gas by seating or separating the valve body from the valve seat;

an armature for separating the valve body from the valve seat under the action of a current flowing through an electromagnetic coil;

a first elastic member for normally driving the valve body in a direction to close the valve, one end of the first elastic member engaging with a holding plate provided on a valve shaft which constitutes a part of the valve body, and the other end of the first elastic member being secured in place; and a second elastic member for normally driving the valve body in a direction to open the valve, one end of the second elastic member engaging with the armature, and the other end thereof engaging with the holding plate.

The valve for re-circulating exhaust gas according to the present invention is normally in a valve-closed state. Upon operation, at first, when a predetermined voltage is applied to the electromagnetic coil, the valve body moves in a direction to open the valve. In this situation, the second elastic member acts to shorten its length, and ultimately the armature itself abuts against the holding plate which holds the first elastic member. Next, the armature displaces the holding plate while opposing the restorative force of the first elastic member, and moves the valve body in a direction to open the valve. As a result, the valve body allows communication between the inlet port and the outlet port. More specifically, the armature acts in a direction to shorten the first elastic member using its full amount of movement. The shaft of the valve body which is formed integrally with the holding plate is displaced, and the valve body is separated from the valve seat. Thus a desired opening is achieved. When it is intended to seat the valve body on the valve seat, the application of voltage to the electromagnetic coil is stopped. As a result, the first elastic member, which has a stronger restorative force than the second elastic member, displaces the holding plate. Concurrently, the armature also moves in a direction to return it to its original position. Finally, when the armature is separated from the holding plate, only the armature is moved as it returns to its original position as a result of the elongation of the second elastic member.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 12 is a schematic explanatory view of a valve system for re-circulating exhaust gas designed according to the present invention.

DESCRIPTION OF THE PREFERRED EMBODIMENTS

Figure 1:
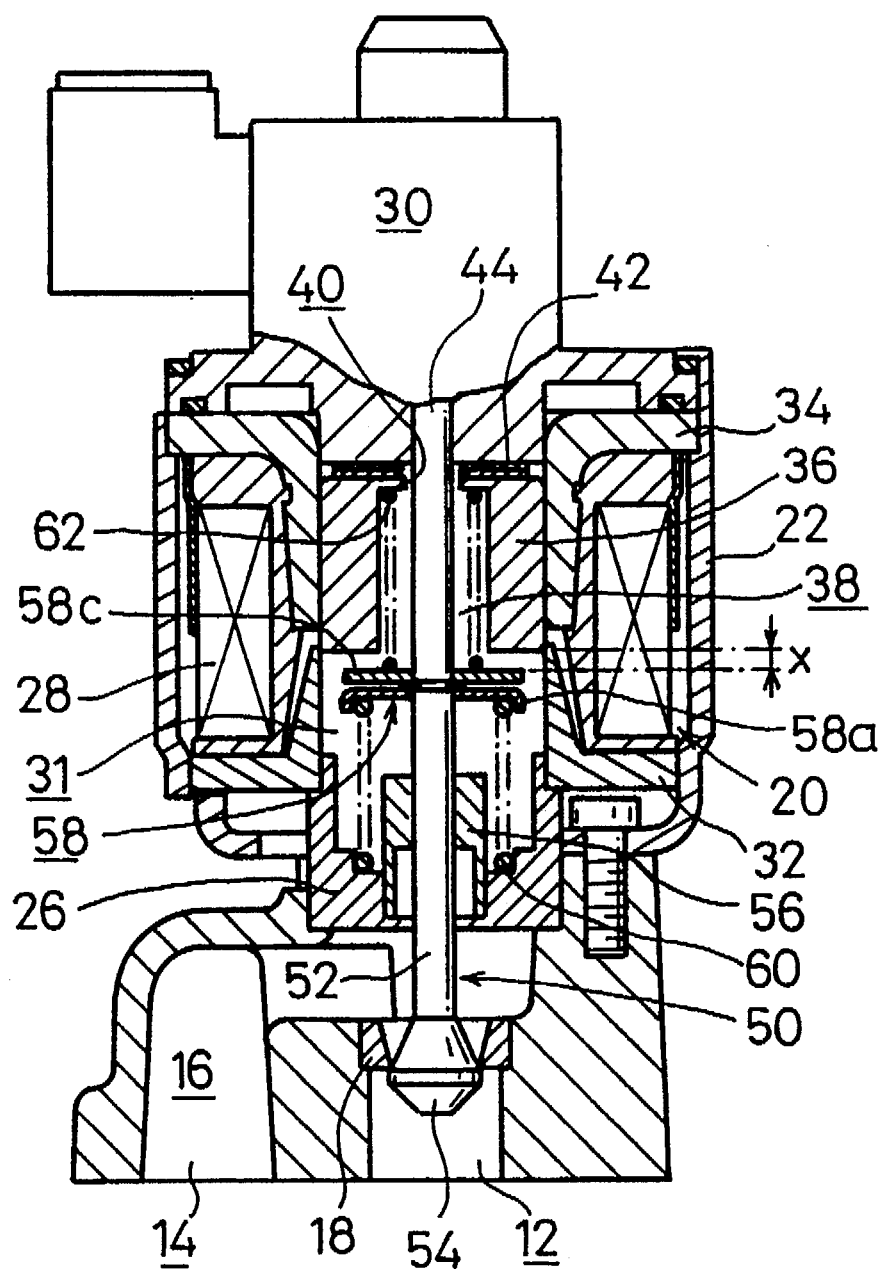
FIG. 1 is a schematic view illustrating in vertical cross-section a state in which a valve body of a valve for re-circulating exhaust gas according to one embodiment of the present invention is disclosed.

Next, a valve for re-circulating exhaust gas according to the present invention will be explained in detail below referring to preferred embodiments with reference to the attached drawings.

A passage 16 for re-circulating exhaust gas is defined through a body 10 in order to provide communication between an inlet port 12 and an outlet port 14. The inlet port 12 communicates with an engine exhaust system (not shown), and the outlet port 14 communicates with the engine intake system. A valve seat 18 is provided inside the passage 16. A casing 22 surrounding an actuator 20 is secured to the body 10 through a bolt 24. A substantially cylindrical holding member 26 is interposed between the casing 22 and the body 10. An electromagnetic coil 28 making up part of the actuator 20 is located above the holding member 26 and is accommodated within the casing 28. A sensor unit 30 is secured to the casing 22 at its uppermost position. First and second guides 32, 34 are arranged inwardly of the electromagnetic coil 28 defining a column-shaped space. The first guide 32 is held by the holding member 26. The second guide 34 is held by the casing An armature 36 is arranged movably within a space 31 defined by the first and second guides 32, 34. The armature 36 has a cylindrical chamber 38 defined therein which opens at its lower end, and has a through-hole 40 defined at its upper end. A shock-absorbing member 42 which acts as a cushion is provided on the upper end of the armature 36 and abuts against a lower end surface of the sensor unit 30. The shock-absorbing member 42 may alternatively be provided on the lower end surface of the sensor unit 30 instead of on the upper end surface of the armature 36, or may be provided on both of the upper and lower end surfaces. The valve for re-circulating exhaust gas according to this embodiment has a valve shaft 52. The valve shaft 52 continues to a sensor rod 44, penetrates through the through-hole 40, and extends to the sensor unit 30. Thus, the position of a main valve body 54 for constructing the other end of the valve shaft 52 can be directly detected. A bearing 56 provided on the holding member 26 ensures smooth movement of the valve shaft 52 in its axial direction. A holding plate 58 is secured at one end of the valve shaft. As easily comprehended from FIG. 2, the holding plate 58 includes a retainer 58a, a clip member 58b fitting into an annular groove of the valve shaft 52, and a washer 58c located over the clip member 58b and fitted onto the valve shaft 52. In this arrangement, as shown by the broken line in FIG. 2, assembly can be easily performed when the sensor rod 44 and the valve shaft 52 are constructed separately. One end of a first elastic member 60, which is a primary elastic member, is seated on the holding plate 58, and the other end thereof is seated in a recess of the holding member 26. A second elastic member 62, which functions as a subsidiary member, is provided inside the armature 36. The second elastic member 62 engages with the washer 58c. The washer 58c is located under the lower end of the armature 36, with a small clearance X existing therebetween.

The valve for re-circulating exhaust gas according to the present invention is basically constructed as described above. Its operation will be explained below.

The armature 36 remains located at its original position when a voltage is not applied to the electromagnetic coil 28.

Figure 3:
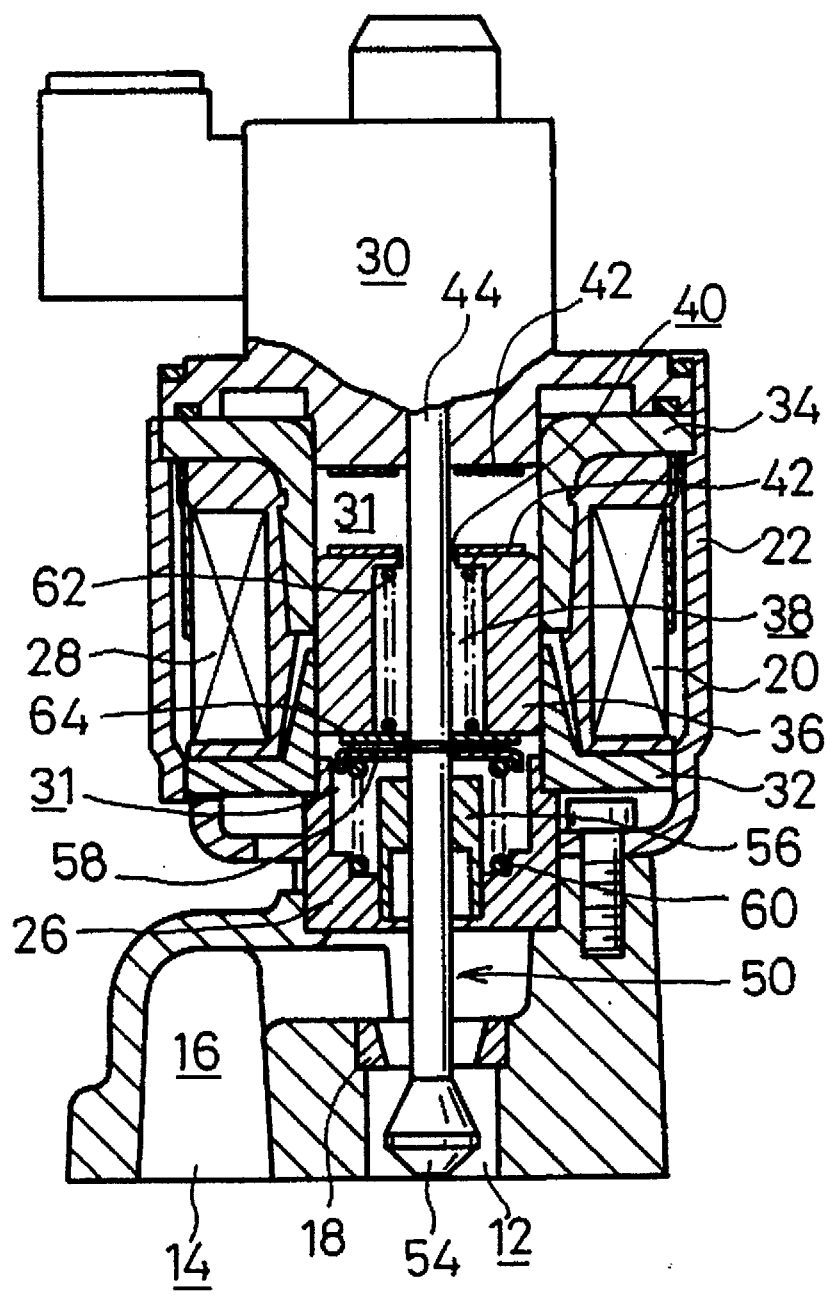
FIG. 3 is a schematic view illustrating in vertical cross-section a state in which the valve body of the valve for re-circulating exhaust gas shown in FIG. 1 is open.

Accordingly, the main valve body 54 making up part of the valve member 50 remains seated on the valve seat 18, and communication between the inlet port 12 and the outlet port 14 is prevented. When it is desired to make communication between the inlet port 12 and the outlet port 14 through the exhaust gas re-circulating passage in order re-circulate the exhaust gas, a predetermined initial voltage is applied to the electromagnetic coil 28. As a result, the armature 36 is displaced downward, and the clearance X is gradually shortened. Thus, the second elastic member 62, with its one end seated on the armature 36, presses the washer 58c by means of its restorative force. When the armature 36 finally abuts against the washer 58c, a voltage which is larger than the foregoing initial voltage is applied to the electromagnetic coil 28. When the electromagnetic force generated thereby becomes larger than the restorative force of the first elastic member 60, the pressing operation of the armature 36 against the hold plate 58 reduces the length of the first elastic member 60 while increasing the restorative force thereof, and the valve member 50 is displaced downward. Consequently, the main valve body 54 becomes separated from the valve seat 18. The inlet port 12 thereby communicates with the outlet port 14, and exhaust gas introduced from the inlet port 12 flows toward the outlet port 14 (see FIG. 3).

On the other hand, when the main valve body 54 making up part of the valve member 50 is unseated from the valve seat 18, at first application of voltage to the electromagnetic coil 28 is stopped. Accordingly, the first elastic member 60 lifts the holding plate 58 upwardly by means of its strong restorative force. Concurrently, the washer 58c of the holding plate 58 operates to reduce the length of the second elastic member 62, which has a weaker restorative force than that of the first elastic member 60. The washer 58c finally abuts against the bottom of the armature 36. The first elastic member 60 becomes further elongated, during which time the armature 36, the second elastic member 62 and the washer 58c are integrally displaced upwardly. When the first elastic member 60 has ceased to exert its restorative force, the armature 36 is still influenced by the second elastic member 62 and continues its upward movement. The armature 36 finally arrives at the original position, and completes the operation.

The above series of operations are converted into positional detection signals of the main valve body 54 in accordance with the displacement of the sensor rod 44 extending from the sensor unit 30, and introduced into a feedback control circuit (not shown). In this embodiment, one end of the valve shaft 52 continues to the sensor rod 44, which extends to the sensor unit 30 through the through-hole 40. Thus, the position of the main valve body 54 can always be detected accurately independently of the operation of the armature 36, and control of the valve can be performed with high accuracy.

The present inventors investigated the operation of a conventional valve for re-circulating exhaust gas having a structure as shown in FIG. 12.

This conventional valve includes an armature 102, a retainer 104 abutting against the armature 102, a valve member 106 which is integrally displaced with the retainer 104, a first elastic member 108 engaging with the retainer 104 and biasing the valve member 106 in a direction to close the valve, and a second elastic member 110 engaging with the armature 102 and biasing the valve member 106 in a direction to open the valve.

It is assumed, for example, that the first elastic member 108 for closing the valve has a spring constant $k_1$ of 1.0 and a restorative force $P_1$ of 70, and that the second elastic member 110 for opening the valve has a spring constant $k_2$ of 0.6 and a restorative force $P_2$ of 30. When it is desired to move the valve member 106 by 20 mm, the combined restorative forces become as follows:

$$P_1 - P_2 = 40.$$

Thus, in order to move the valve member 106 by 20 mm, it is necessary to generate a combined force of 72 as a result of subtracting:

$$P_2 = 30 + (0.6 \times 20) = 18$$

from $$P_1 = 70 + (1.0 \times 20) = 90.$$

Figure 2:
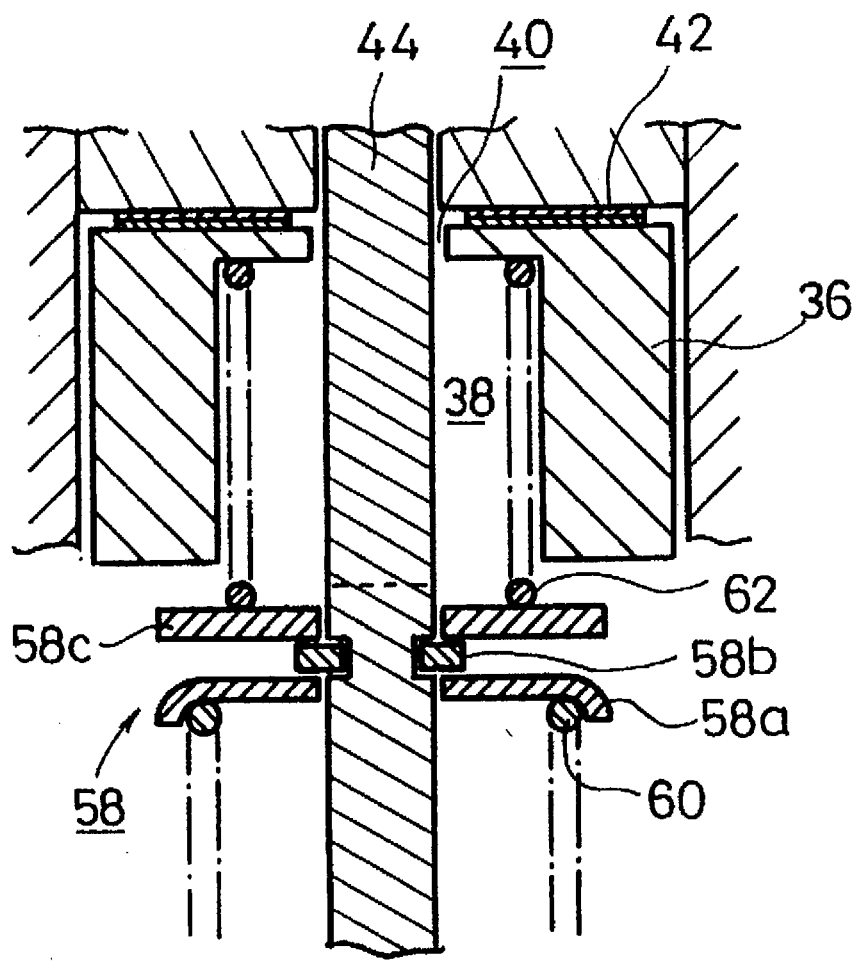
FIG. 2 is an enlarged cross-sectional view of an important part of the valve for re-circulating exhaust gas shown in FIG. 1.

However, the present invention has the following advantages when compared with the structure shown in FIG. 2.

First, it is assumed that the second elastic member 62 has a spring constant $k_3$ of 0.6 and a restorative force $P_3$ of 30, and that the first elastic member 60 has a spring constant $k_4$ of 1.0 and a restorative force $P_4$ of 40. The distance between the armature 36 and the washer 58c which forms part of the holding plate 58 is set at 5 mm. On this premise, when it is desired to move the main valve body 54 by 20 mm, the restorative force $P_3$ becomes as follows:

$$P_3 = 30 + (0.6 \times 5) = 33.$$

Thus, when the second elastic member 62 exerts a force of 33, the armature 36 abuts against the washer 58c making up part of the holding plate 58. However, in the present invention, once the armature 36 abuts against the washer 58c, it becomes unnecessary for any force to overcome the restorative force of the second elastic member 62. Therefore, it is satisfactory to only shorten the first elastic member 60 by 20 mm. Accordingly, it is sufficient for the armature 36 merely to exert a force of, $$P_4 = 40 + (1.0 \times 20) = 60$$

for compressing the second elastic member.

This means that a force equalling only ⅔ of that of the structure shown in FIG. 12 need be exerted for accomplishing the same work.

Figure 4:
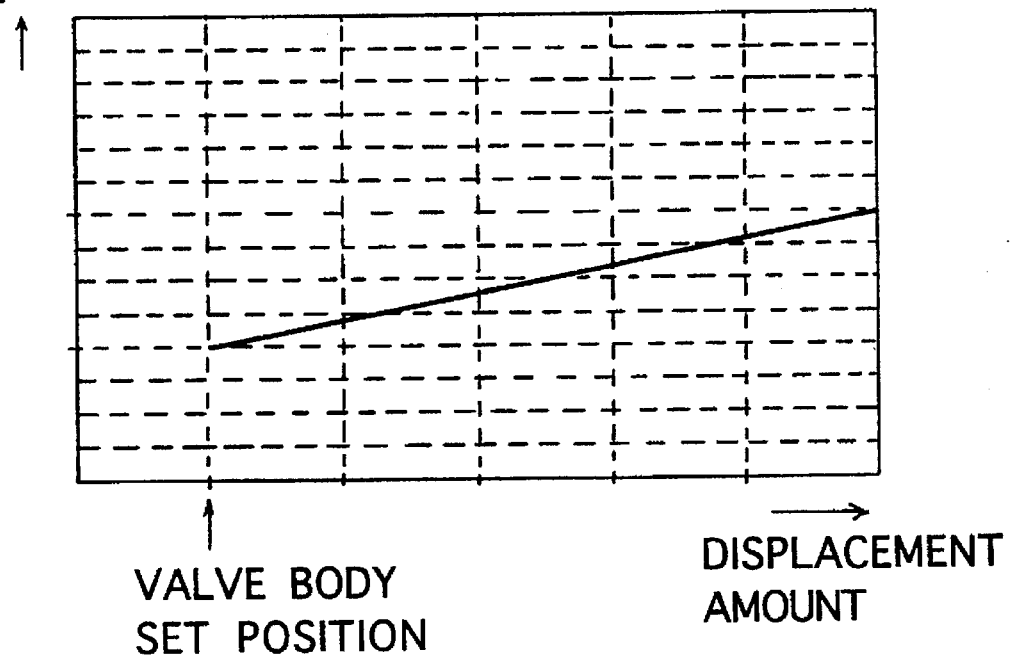
FIG. 4 shows a characteristic curve which represents the correlation between the amount of movement and electromagnetic force in one conventional technique.

FIG. 4 shows a load characteristic of the coil spring employed in one conventional technique. The abscissa represents the displacement amount of the valve body, while the ordinate axis represents the force necessary to be exerted by the armature in order to displace the valve body, depending on the coil spring. As shown in FIG. 4, as the displacement amount of the valve body increases concurrent with the contraction of the coil spring, the electromagnetic force applied to the armature and required for producing such a large displacement inevitably becomes large.

Figure 5:
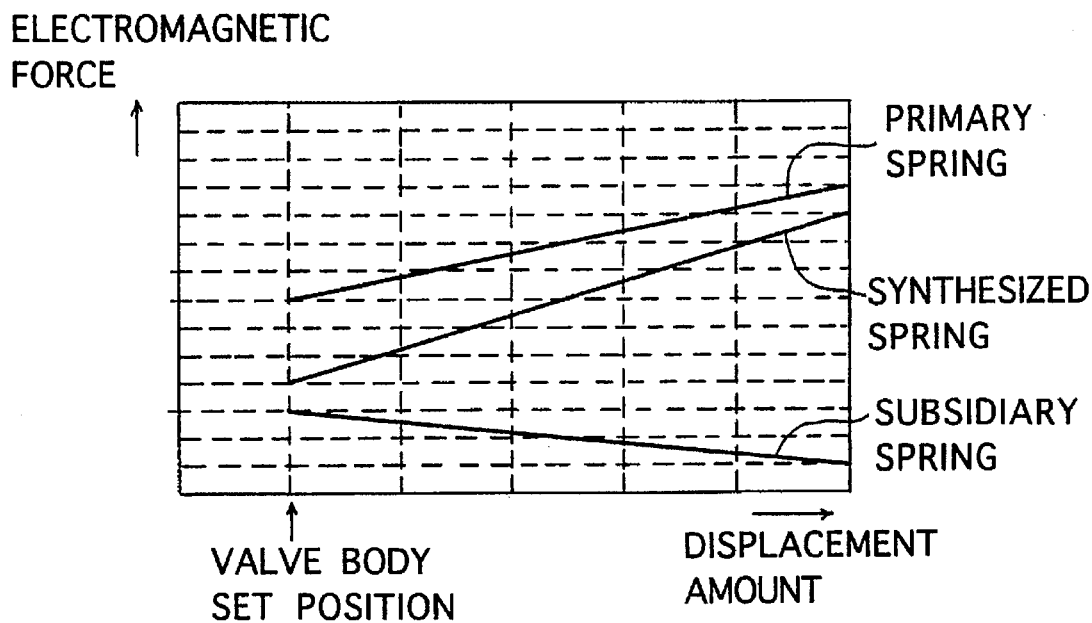
FIG. 5 shows characteristic curves which represent the correlation between the amount of movement of the valve body and electromagnetic force in another conventional technique.

FIG. 5 is a graph showing the relationship between the displacement amount of the valve body and the corresponding electromagnetic force applied to the armature in another conventional example, using a first coil spring for driving the valve body in a direction to close the valve, and a second coil spring for driving the valve body in a direction to open the valve. The conventional mechanism shown in FIG. 12 falls under this type. More specifically, FIG. 5 shows a load characteristic for displacing the plunger by overcoming the coil spring which presses the valve body in a direction to close the valve, and a load characteristic of the coil spring which acts in a direction to allow the valve body to open the valve. In this case, the electromagnetic force applied to the armature is a synthesized load made up of the combined loads of first and second coil springs, and presenting the characteristic curve as shown in FIG. 5.

Figure 6:
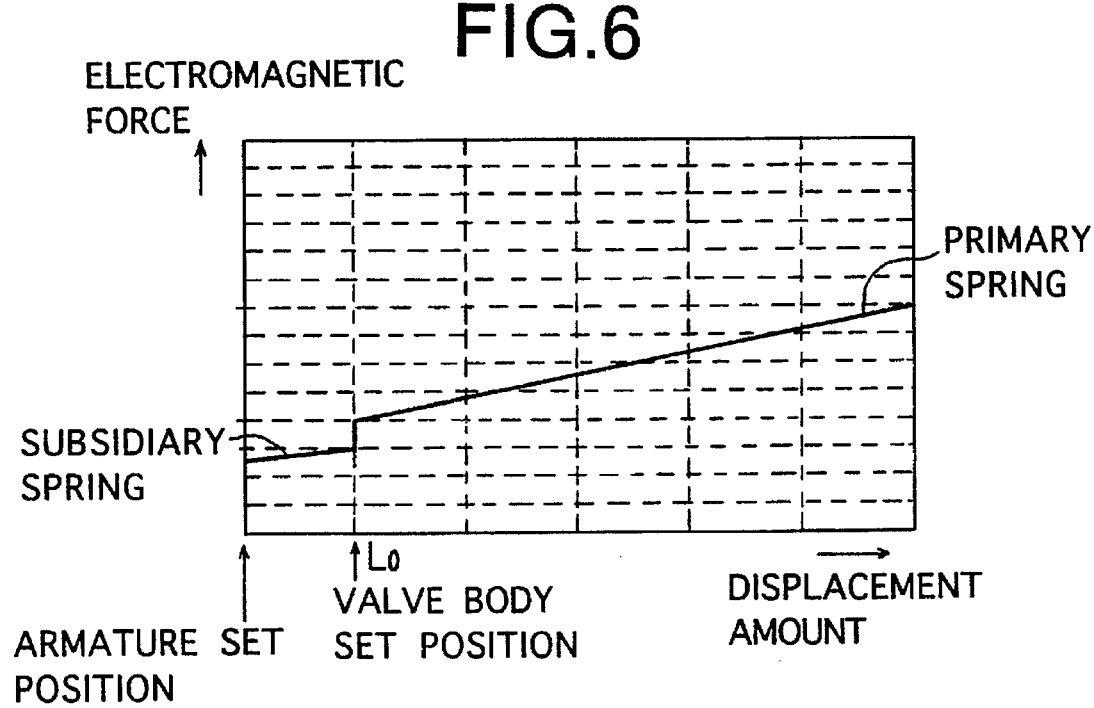
FIG. 6 shows characteristic curves which represent the correlation between the amount of movement of the valve body and a required electromagnetic force according to an embodiment of the present invention.

However, in the present invention, as shown in FIG. 6, the load characteristic of the second elastic member 62 has no relation to the force required for overcoming the restorative force of the first elastic member 60 and required for opening the valve body. Therefore, a state is reached at a set position $L_0$, in which no displacement is made While continuing the application of voltage to the electromagnetic coil 28. When a voltage large enough to overcome the restorative force of the first elastic member 60 is reached, be applying an additional voltage to the electromagnetic coil 28, the armature 36 begins to move again.

As clarified from the foregoing description, in this embodiment, no force is required for compressing the second elastic member 62 after the armature 36 abuts against the washer 58c, even when it is intended to perform an opening operation of the valve body using two respective coil springs. Therefore, only a electromagnetic force sufficient to oppose to the restorative force of the first elastic member 60 is required. Namely, a load depending on the synthesized force of the two coil springs is not required in the present invention. Consequently, the following advantages are obtained: The electromagnetic force applied for moving the armature 36 can be reduced, miniaturization of the entire actuator is achieved, and control for opening and closing the valve is performed accurately and stably.

Figure 7:
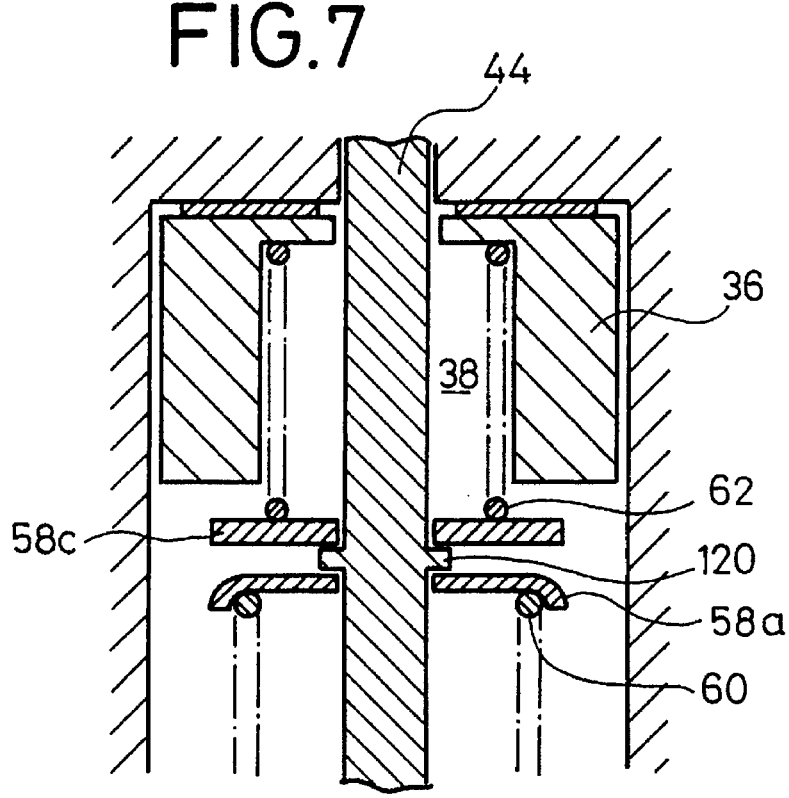
FIG. 7 is an enlarged cross-sectional view of an important part of another embodiment of the present invention.
Figure 8:
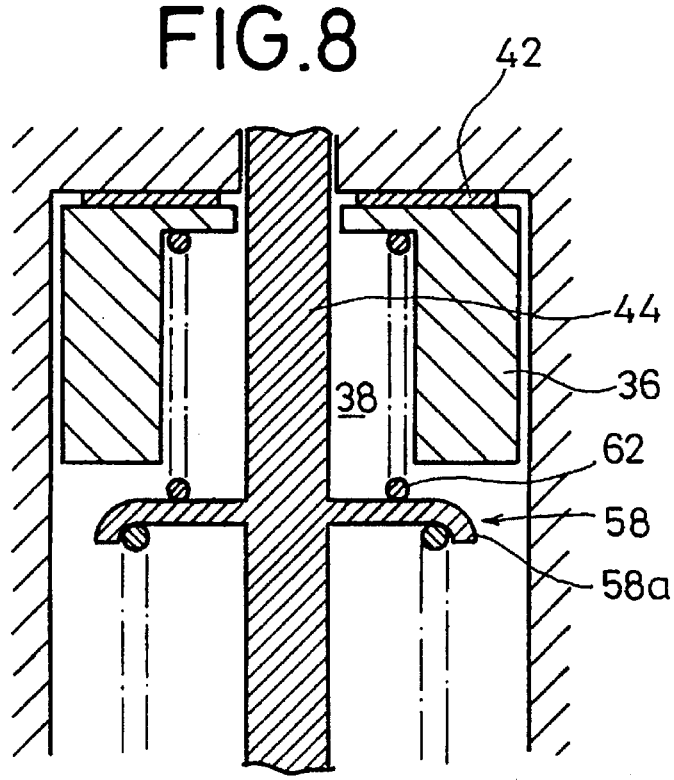
FIG. 8 is an enlarged cross-sectional view of an important part of still another embodiment of the present invention.
Figure 9:
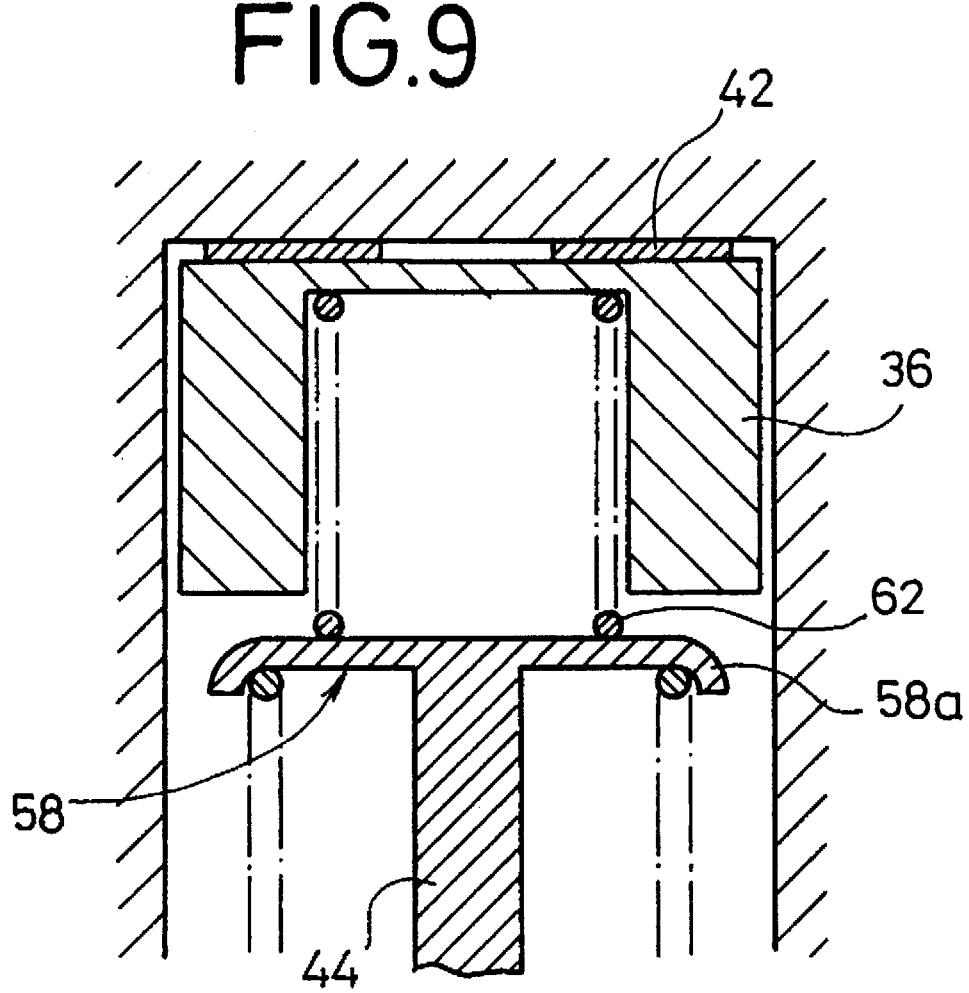
FIG. 9 is an enlarged cross-sectional view of an important part of still another embodiment of the present invention.
Figure 10:
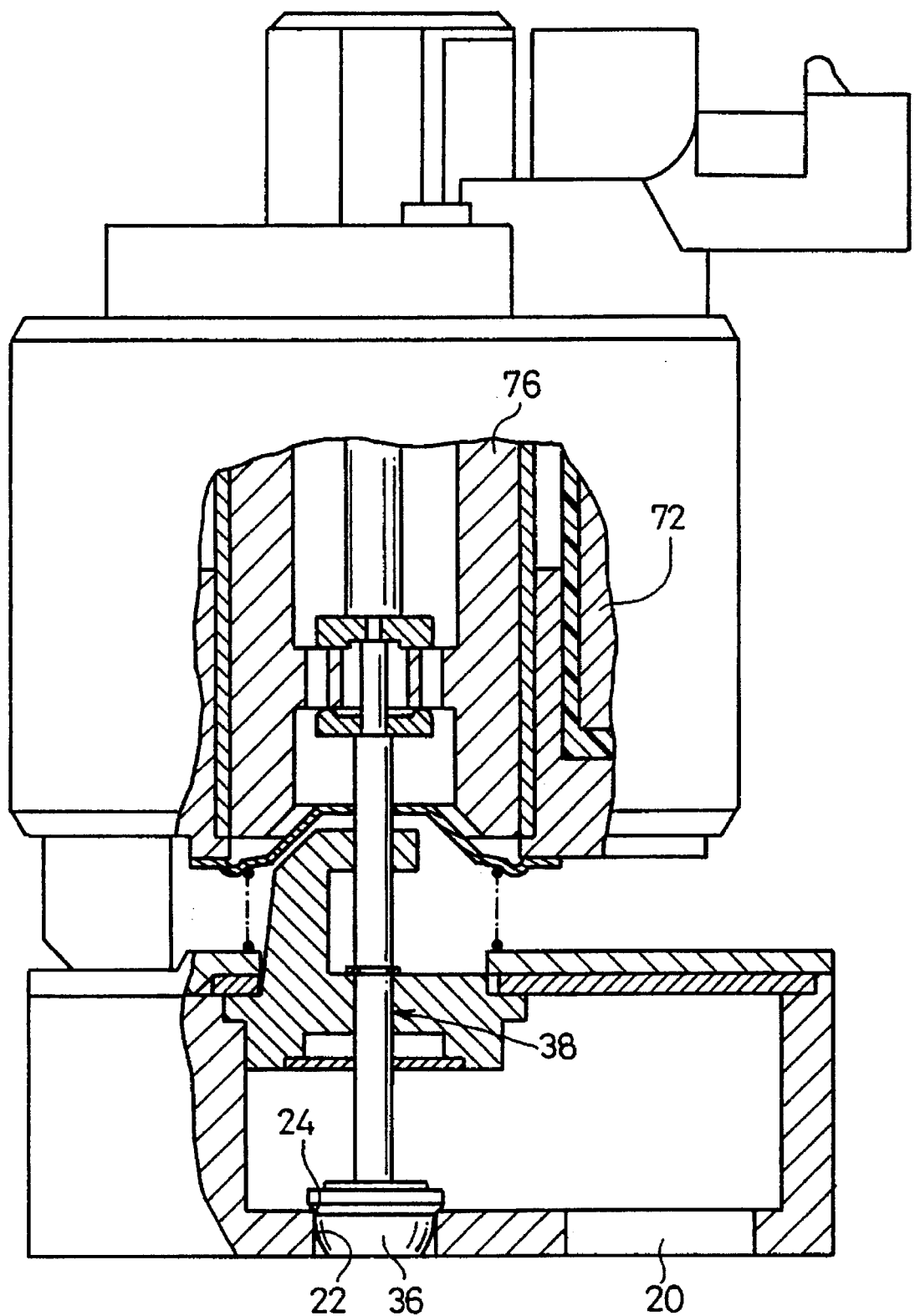
FIG. 10 is an explanatory view shown in vertical cross-section of an important part of a device according to one conventional technique.
Figure 11:
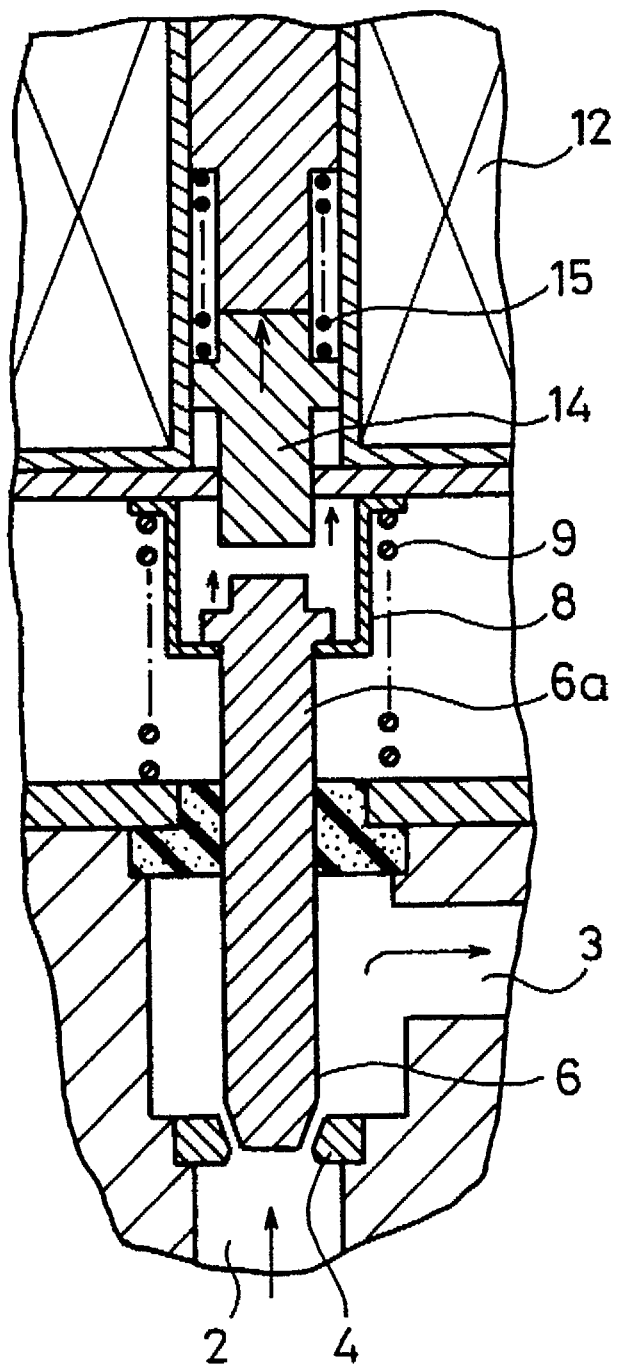
FIG. 11 is an explanatory view shown in vertical cross-section of an important part of a device according to another conventional technique.

FIGS. 7–9 show other embodiments of the present invention, respectively. In FIG. 7, a flange 120 is integrally provided on a valve member 50, instead of the clip. In FIG. 8, the holding plate 58 is constituted only by a retainer 58a, and hence one end of the second elastic member 62 is seated on the retainer 58a. Finally, FIG. 9 illustrates an embodiment in which no sensor rod 44 is used.

As described above, in the present invention, the armature is structurally separated from the valve member, thereby providing the mechanism in which the armature comes into abutment with a washer. Thus abrasion, shock, deformation, and so on, do not occur when the valve body is seated on the seat portion. Further, it is possible to suppress a bouncing motion suspected to occur when the valve body is seated on the valve seat. In addition, other distinctive effects are obtained. Namely, miniaturization of the actuator is achieved because only a small electromagnetic force is required, and control for opening and closing the valve is performed accurately.

What is claimed is:

1. A valve for re-circulating exhaust gas, comprising:
   a body having a passage therein for re-circulating an exhaust gas, the body including an inlet port and an outlet port;
   a valve seat provided in said passage for recirculating the exhaust gas;
   a valve body for controlling the amount of exhaust gas flowing through said passage for re-circulating the exhaust gas by seating or separating the valve body from said valve seat;
   an armature for separating said valve body from said valve seat under the action of a current flowing through an electromagnetic coil;
   a first elastic member for normally driving said valve body in a direction to close said valve, one end of the first elastic member engaging with a holding plate provided on a valve shaft which constitutes a part of said valve body, and the other end of the first elastic member being secured in place; and
   a second elastic member for normally driving said valve body in a direction to open said valve, one end of the second elastic member engaging with said armature, and the other end thereof engaging with said holding plate.

2. The valve for re-circulating exhaust gas according to claim 1, wherein said first elastic member has a restorative force which is set to be larger than the restorative force of said second elastic member.

3. The valve for re-circulating exhaust gas according to claim 1, wherein a gap having a predetermined distance is provided between one end of said armature and said holding plate, for separating said armature from said holding plate in a valve-closed state.

4. The valve for re-circulating exhaust gas according to claim 1, wherein said armature has a recess defined in an open lower portion thereof, wherein said one end of said second elastic member engages with said recess, and said other end of said second elastic member abuts against one surface of said holding plate.

5. The valve for re-circulating exhaust gas according to claim 1, wherein said holding plate includes a retainer engaging with said valve shaft.

6. The valve for re-circulating exhaust gas according to claim 5, wherein said holding plate further comprises a washer, and said other end of said second elastic member engages with said washer.

7. The valve for re-circulating exhaust gas according to claim 6, wherein a clip is inserted between said retainer and said washer, and said clip engages with an annular groove provided on said valve shaft.

8. The valve for re-circulating exhaust gas according to claim 1, further comprising a sensor for detecting the position of said valve body, wherein a sensor rod extends from said sensor and slidably penetrates through a hole provided in said armature, said sensor rod engaging with an end of said valve shaft.

* * * * *